United States Patent
Lunden et al.

(10) Patent No.: US 10,932,188 B2
(45) Date of Patent: Feb. 23, 2021

(54) DRX OPERATION WITH DUAL CONNECTIVITY

(71) Applicant: Nokia Technologies Oy, Espoo (FI)

(72) Inventors: Petteri Lunden, Espoo (FI); Elena Virtej, Espoo (FI); Esa Malkamäki, Espoo (FI)

(73) Assignee: Nokia Technologies Oy, Espoo (FI)

(*) Notice: Subject to any disclaimer, the term of this patent is extended or adjusted under 35 U.S.C. 154(b) by 533 days.

(21) Appl. No.: 14/497,017

(22) Filed: Sep. 25, 2014

(65) Prior Publication Data
US 2015/0098379 A1  Apr. 9, 2015

Related U.S. Application Data

(60) Provisional application No. 61/888,469, filed on Oct. 8, 2013.

(51) Int. Cl.
*H04W 52/02* (2009.01)
*H04W 76/28* (2018.01)

(52) U.S. Cl.
CPC ... *H04W 52/0209* (2013.01); *H04W 52/0216* (2013.01); *H04W 76/28* (2018.02); *Y02D 30/70* (2020.08)

(58) Field of Classification Search
None
See application file for complete search history.

(56) References Cited

U.S. PATENT DOCUMENTS

2015/0319802 A1* 11/2015 Lindoff ............... H04W 24/02
455/422.1

FOREIGN PATENT DOCUMENTS

| WO | 2014/079017 A1 | 5/2014 |
|---|---|---|
| WO | 2014/094885 A1 | 6/2014 |
| WO | 2014/121504 A1 | 8/2014 |

OTHER PUBLICATIONS

Extended European Search Report received for corresponding European Patent Application No. 14184170.0, dated Apr. 29, 2015, 6 pages.
"New Study Item Description: Small Cell enhancements for E-UTRA and E-UTRAN—Higher-layer aspects", 3GPP TSG-RAN Meeting#58, RP-122033, Agenda Item: 13.2, NTT Docomo, Inc., Dec. 4-7, 2012, pp. 1-5.

(Continued)

*Primary Examiner* — Willie J Daniel, Jr.
(74) *Attorney, Agent, or Firm* — Mintz Levin Cohn Ferris Glovsky and Popeo, P.C.

(57) ABSTRACT

Methods and apparatus, including computer program products, are provided for dual connectivity. In one aspect there is provided a method. The method may include applying, at a user equipment having dual connectivity to a first wireless access point and a second wireless access point, a first discontinuous receive cycle pattern in a second cell served by the second wireless access point, when the user equipment is active in a first cell served by the first wireless access point; and applying, at the user equipment having dual connectivity to the first wireless access point and the second wireless access point, a second discontinuous receive cycle pattern in the second cell, when the user equipment is not active in the first cell. Related apparatus, systems, methods, and articles are also described.

20 Claims, 4 Drawing Sheets

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) Protocol specification (Release 11)", 3GPP TS 36.321, V11.3.0, Jun. 2013, pp. 1-57.

"3rd Generation Partnership Project; Technical Specification Group Radio Access Network; Evolved Universal Terrestrial Radio Access (E-UTRA); Radio Resource Control (RRC);Protocol specification (Release 11)", 3GPP TS 36.331, V11.5.0, Sep. 2013, pp. 1-347.

"3rd Generation Partnership Project; Technical Specification Group Radio Access Network; Evolved Universal Terrestrial Radio Access (E-UTRA); Requirements for support of radio resource management(Release 11)", 3GPP TS 36.133, V11.6.0, Sep. 2013, pp. 1-783.

"Comparison of the UP Alternatives", 3GPP TSG-RAN WG2 Meeting #83, R2-132338, Agenda item: 7.2.4, NSN, Nokia Corporation, NTT Docomo, Inc., Samsung, Aug. 19-23, 2013, pp. 1-5.

"3rd Generation Partnership Project; Technical Specification Group Radio Access Network; Evolved Universal Terrestrial Radio Access (E-UTRA); Physical layer; Measurements (Release 11)", 3GPP TS 36.214, V11.0.0, Sep. 2012, pp. 1-14.

"3rd Generation Partnership Project; Technical Specification Group Radio Access Network; Evolved Universal Terrestrial Radio Access (E-UTRA); LTE physical layer; General description(Release 11)", 3GPP TS 36.201, V11.1.0, Dec. 2012, pp. 1-13.

"3rd Generation Partnership Project; Technical Specification Group Radio Access Network; Evolved Universal Terrestrial Radio Access (E-UTRA); Physical channels and modulation (Release 11)", 3GPP TS 36.211, V11.4.0, Sep. 2013, pp. 1-120.

"3rd Generation Partnership Project; Technical Specification Group Radio Access Network; Evolved Universal Terrestrial Radio Access (E-UTRA); Physical layer procedures(Release 11)", 3GPP TS 36.213, V11.4.0, Sep. 2013, pp. 1-182.

"3rd Generation Partnership Project; Technical Specification Group Radio Access Network; Evolved Universal Terrestrial Radio Access (E-UTRA); Multiplexing and channel coding (Release 11)", 3GPP TS 36.212, V11.3.0, Jun. 2013, pp. 1-84.

\* cited by examiner

DRX OPERATION WITH DUAL CONNECTIVITY

FIELD

The subject matter described herein relates to wireless communications and, in particular, mobility.

BACKGROUND

Discontinuous Reception (DRX) generally refers to a user equipment configured to enter into a DRX state during which time the user equipment enters into a power savings state. This state may include reduced measurement requirements, polling requirements, and the like. When data transfer is needed, the user equipment may exit the standby DRX state, and enter a higher power consumption state and begin more active measurements, polling, and data transfer with the network. For example, in Long Term Evolution (LTE), the user equipment is typically required to read the physical downlink control channel (PDCCH) for allocations. When the user equipment is configured with a DRX cycle, the user equipment may be on and thus available to read the PDCCH for a portion of the DRX cycle, and then may be off and not available to read the PDCCH. The longer the duration of the DRX cycle, the greater the power savings. However, too long a DRX cycle may negatively affect mobility as the user equipment may miss mobility opportunities.

A user equipment, such as a smartphone or other wireless device, may implement dual connectivity to different wireless access points. For example, a user equipment may have a first wireless connection to a macro base station serving a macro cell, and have a second wireless connection to a small cell base station serving a small cell, such as a WiFi network and the like. In some instances, this dual connectivity may be part of a carrier aggregation scheme that allows increased bandwidth and, as such, increased data rates to a user equipment by aggregating carriers. For example, a user equipment may be allocated to a primary carrier serving a primary cell (Pcell), and one or more secondary carriers serving corresponding secondary cells (Scells). These carriers may be continuous within the same frequency band, non-contiguous within a given frequency band, or non-contiguous among frequency bands.

SUMMARY

Methods and apparatus, including computer program products, are provided for dual connectivity.

In some example embodiments, there is provided a method. The method may include applying, at a user equipment having dual connectivity to a first wireless access point and a second wireless access point, a first discontinuous receive cycle pattern in a second cell served by the second wireless access point, when the user equipment is active in a first cell served by the first wireless access point; and applying, at the user equipment having dual connectivity to the first wireless access point and the second wireless access point, a second discontinuous receive cycle pattern in the second cell, when the user equipment is not active in the first cell.

In some variations, one or more of the features disclosed herein including the following features can optionally be included in any feasible combination. The first wireless access point may include at least one of a small cell base station and a wireless local area network access point. The first cell may include at least one of a small cell and a secondary cell. The second wireless access point may include at least one of an evolved node B base station and a macro cell base station. The second cell may include least one of a macro cell and a primary cell. The first discontinuous receive cycle pattern may be shorter than the second discontinuous receive cycle pattern. The first discontinuous receive cycle pattern may be about a 40 millisecond cycle, and the second discontinuous receive cycle pattern may be about a 160 millisecond cycle. The active user equipment may be at least one of making measurements, receiving data, and transmitting data.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
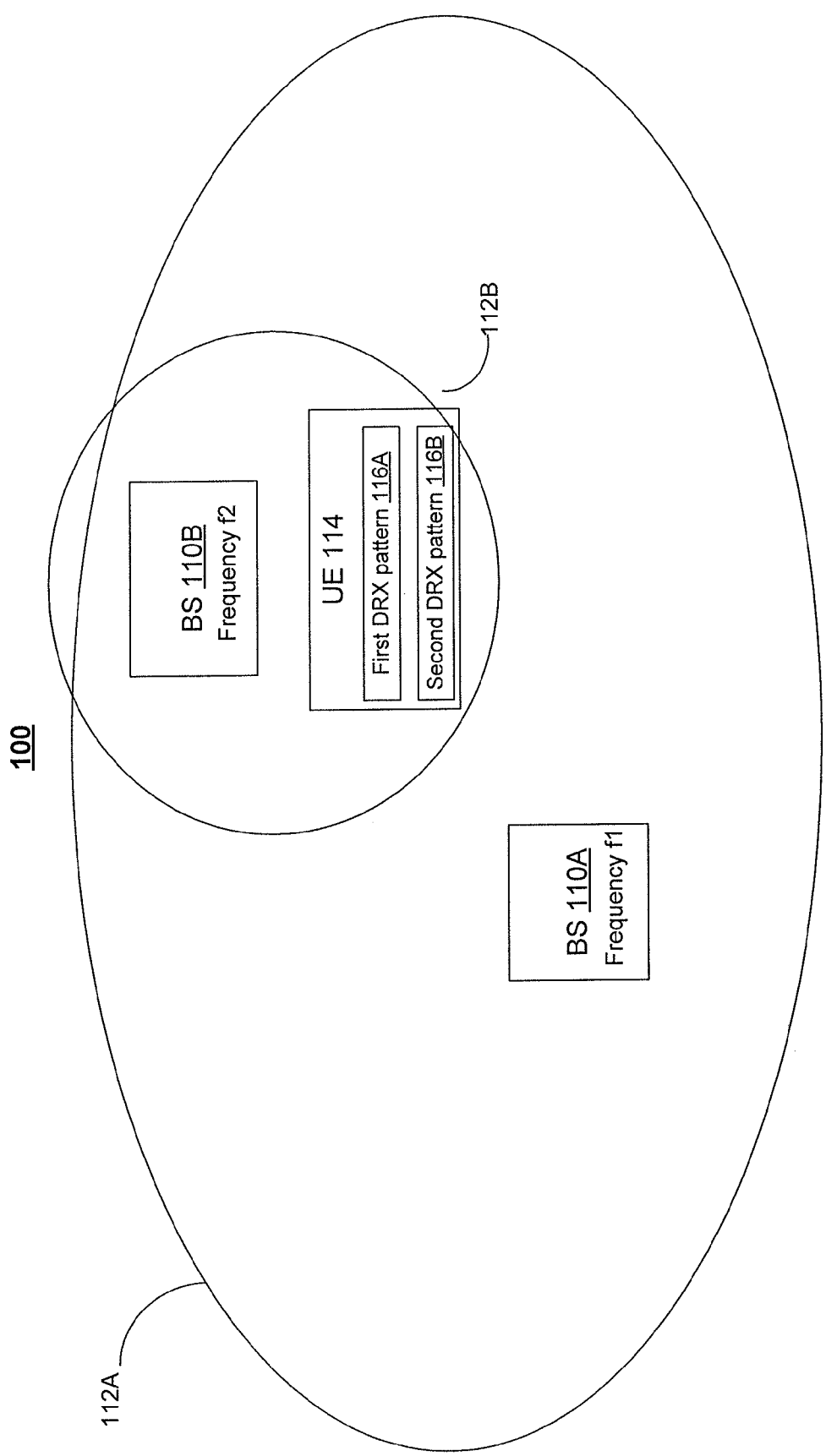
FIG. 1 depict an example of a system configured for dual connectivity, in accordance with some exemplary embodiments.

Like labels are used to refer to same or similar items in the drawings.

DETAILED DESCRIPTION

User equipment measurement requirements may vary based on whether a given user equipment is in DRX. For example, a user equipment in DRX may apply relaxed measurement requirements depending on a DRX cycle length. But in a non-DRX mode, the user equipment may be actively scheduled, performing measurements, such as mobility measurements, read the PDCCH, and the like. The mobility measurements may include measurements of one or more carrier frequencies of neighboring cells as well as the current cell or cells. The measurement requirements may be defined by the need to allow a user equipment to save power during DRX and, on the other hand, the need to perform mobility measurements needed to ensure robust mobility.

In the case of dual connectivity, DRX may present a challenge. For example, using a single/common DRX cycle (or pattern) at the user equipment for both of the dual connections (to the macro base station and the small cell base station) may be difficult to implement due to a non-ideal backhaul. For 3GPP Release 10/11 carrier aggregation, a common DRX is defined between component carriers. As such, the user equipment has a single DRX state machine (and the evolved node B (eNB) base station also has a single DRX state machine for that user equipment) and PDCCH reception in either a PCell or a SCell start an inactivity timer. The user equipment is in Active Time at the same time in both the PCell and the SCell, enters a short DRX cycle at the same time in PCell and SCell, and so forth. This is possible in Release 10/11 carrier aggregation as the PCell and the SCell(s) are served by the same eNB base station. The macro cell eNB base station may be in connection with the small cell eNB base station via an open interface, for example X2, Xn interface, or the like. This interface may be non-ideal, for example, having latency above about 1 millisecond and even up to 60 milliseconds or more, which may introduce significant delay in communication between the macro cell eNB base station and the small cell eNB. The macro cell eNB base station may be in connection with the core network (for example, a mobility management entity (MME) and a serving gateway (S-GW)) via an S1 interface. In some example embodiments, the small cell eNB base station may be in connection with the core network via the macro cell eNB base station. In some example embodiments, the small cell eNB may in direct connection with core network. For dual connectivity where two or more cells, to which the user equipment is connected, are served by different eNB base stations, having a common DRX is difficult because of the non-ideal backhaul connecting the eNB base stations. Non-ideal backhaul implies a latency of about 1 to 60 milliseconds, so a master eNB base station (MeNB, serving a corresponding macro cell or primary cell) is typically not exactly aware when the secondary eNB base station (SeNB, serving a corresponding small cell or secondary cell) schedules the user equipment and vice versa. However, using two different independent DRX operations may also present issues as well. For example, a first DRX configuration may be used between the user equipment and a macro base station, and another; independent DRX configuration may be used for a second connection to a small cell base station. Using two different, independent DRX configurations and operations may, however, compromise mobility robustness as the user equipment may be in a long DRX in the macro cell but in a non-DRX mode or Active Time actively receiving/transmitting data as well as making measurements in the small cell, but in the macro cell the measurements would be less frequent due to a long DRX. For example, the MeNB serving the PCell mobility may be compromised by longer measurement period, or the network may need to configure the user equipment with a maximum (for example, 40 millisecond) DRX cycle to ensure robust mobility.

Another example scenario which may cause an issue with independent DRX occurs when a U-plane architecture alternative 1A or 2A is specified (for example, no bearer split, reference for 1A and 2A as described in in R2-132338, NSN, Nokia Corporation 'Comparison of the UP Alternatives'), in an arrangement where the user data may go through the SeNB and control signaling (for example, signaling radio bearer (SRB)) may go through the MeNB. When this is the case, the user equipment may go into DRX in the MeNB while still actively scheduled in the SeNB. If long DRX cycles are used, this may lead to severe delays in receiving control signaling from the MeNB (for example, handover (HO) commands).

In some example embodiments, the subject matter disclosed herein may provide a user equipment configured with separate DRX cycles and other DRX parameters at a first, macro base station and a second, small cell base station. Specifically, the small cell base station DRX may operate independently based on user equipment activity in the small cell being served by the small cell base station, in accordance with some example embodiments. However, the first, macro base station's DRX may depend on the activity in the small cell. When the user equipment is active in the small cell (for example, actively receiving/transmitting data, making measurements and the like), the user equipment may follow a more frequent (for example, shorter) DRX cycle or pattern in the first, macro base station. On the other hand, when the user equipment is not active in the small cell, the user equipment may follow a less frequent (for example, longer) DRX cycle or pattern in the first, macro base station.

In some example embodiments, the user equipment may be configured with a relatively shorter DRX for use in the macro cell/macro base station when (or so as long as) the user equipment is active in the small cell/small cell base station. For this purpose, the user equipment may, in some example embodiments, be configured with a secondary DRX cycle for the macro cell/macro base station/MeNB. In some example embodiments, the user equipment may follow a relatively longer DRX for use in the macro cell/macro base station when the user equipment is not active in the small cell/small cell base station. When the user equipment is inactive in both the small cell/base station and the macro cell/base station, the user equipment may, in some example embodiments, take full advantage of the opportunities to conserve resources via DRX and apply a relatively longer DRX cycle. To illustrate, the user equipment may, for example, follow a DRX cycle of about 160 milliseconds (or, for example, 80 milliseconds, 320 milliseconds, as well as other times) in the macro cell/base station when the user equipment is not active in the small cell, but apply or follow a DRX cycle of about 40 milliseconds (or, for example, 20 milliseconds, 80 milliseconds, as well as other times) when the user equipment cycle is active in the small cell/cell base station.

When the user equipment is not active in the macro cell or the small cell, then the user equipment may follow the longer DRX cycle (for example, 160 milliseconds and the like) but even a longer DRX cycle may be configured for this (for example, 320 milliseconds, 640 milliseconds, as well as other times) in order to save power.

The longer or shorter DRX cycle times may, in some example embodiments, be signaled to the user equipment by the network, specified in a standard, and/or provided in any other way.

FIG. 1 depicts an example of a system 100, in accordance with some example embodiments. System 100 may include a user equipment (UE) 114 having a dual connectivity capability, so user equipment 114 may couple to a macro base station 110A serving macro cell 112A (which in the case of carrier aggregation may be referred to as a Pcell) and couple to one or more other cells, such as small cell 112B served by base station 110B. In the case of carrier aggregation, small cell 112B may be referred to as a secondary cell (Scell). In the example of FIG. 1, the Pcell 112A may be at a first frequency, f1, while the Scell 112B may be at a second, different frequency, f2, so carrier aggregation by user equipment 114 may be an inter-frequency carrier aggregation. For dual connectivity, the macro cell and the small cell may be served by separate wireless access points, such as eNB base stations, MeNB, SeNB, and the like, although in the case of 3GPP Release 10/11 carrier aggregation, the PCell and SCell may be served by the same eNB base station.

In the example depicted at FIG. 1, the user equipment 114 may include a first DRX configuration including a first DRX cycle time (or pattern) 116A and a second DRX configuration including a second DRX cycle time (or pattern) 116B. The first DRX cycle 116A may be shorter in duration, when compared to the second DRX cycle 116B. As such, the first DRX cycle 116A may be implemented at the user equipment 114, when in DRX with the macro cell 112A/base station 110A and the user equipment is active in the small cell 112B. The second DRX cycle 116B may be implemented at the user equipment 114 when in DRX with the macro cell 112A/base station 110A and the user equipment is not active in the small cell 112B.

The user equipment 114 may be referred to as, for example, a mobile station, a mobile unit, a subscriber station, a wireless terminal, a tablet, a smartphone, a wireless device, or the like. The user equipment may include at least one processor and at least one memory including code, which when executed by the at least one processor provides one or more of the operations disclosed herein with respect to the user equipment. The user equipment may be implemented to perform carrier aggregation and/or dual connectivity, and may include one or more transceivers in order to access these carriers.

Base station 110A (for example, an MeNB) may be configured as an evolved Node B (eNB) base station serving a Pcell 112A, while Scell 112B may be served by another base station 110B (for example, an SeNB). The base stations may each be implemented as an eNB type base station configured in accordance with standards, including the Long Term Evolution (LTE) standards, such as for example 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). For example, a small cell base station (or a wireless access point or a remote radio head, for example) may be implemented to cover a small cell, or coverage area, examples of which include a residence, a small business, a building, an office, or a small area. The small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less/smaller coverage/range and lower power capabilities given its limited coverage area or class. Furthermore, small cell base station may have limited (or non-ideal) backhaul connection that may have higher latency or lower throughput than macro cell base stations. This limited backhaul connection may affect communication between small cell base station and other base stations and other network elements or nodes. A user equipment may act as an access point or a base station for other devices (multiple devices, or part of device to device communication or group communication), so that in some cases the user equipment may be considered a limited capability base station serving a small cell. The small cell base station may also be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. The small cell base station may be implemented as a secondary base station, for example, a secondary cell (SCell) eNB in carrier aggregation, and may be called a secondary eNB (SeNB). Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macro cell served by a typical base station, such as for example the eNB base station. The macro cell base station may be also implemented as a primary base station, for example, a primary cell (PCell) eNB in carrier aggregation and may also be called master eNB (MeNB). The base stations may also be configured to provide other types of air interfaces, such as various first generation (1G) communication protocols, second generation (2G or 2.5G) communication protocols, third-generation (3G) communication protocols, fourth-generation (4G) communication protocols, WiFi (or other small cell protocols), and/or any other wireless access network communication protocols. Although certain standards and technologies are described, these are merely examples as other standards and technologies may be used as well.

System 100 may include wireless access links. These access links may include downlinks for transmitting to user equipment and an uplink for transmitting from user equipment to a base station. The downlinks and uplinks may each comprise a modulated radio frequency carrying information, control messages, and the like. Moreover, the base stations may include links, such as for example backhaul links, to other networks (for example, other mobile networks, the Internet, and the like), network nodes, servers, and the like.

Although FIG. 1 depicts a certain quantity and configuration of user equipment, cells, and base stations/wireless access points, other quantities and configurations may be used as well.

In some example embodiments, network signaling may be used between the base stations 110A and 110B, so that the macro base station 110A knows (or is informed of) when user equipment 114 is active in the small cell. Active refers to the user equipment actively making mobility measurements, transmitting or receiving data, reading the PDCCH for allocations, and the like while in the small cell. To illustrate further, when DRX is configured, Active Time may include the time while: onDurationTimer or drx-InactivityTimer or drx-RetransmissionTimer or mac-ContentionResolutionTimer, a Scheduling Request is sent on PUCCH and is pending, an uplink grant for a pending HARQ retransmission can occur and there is data in the corresponding HARQ buffer, or a PDCCH indicating a new transmission addressed to the cell radio network temporary identifier (RNTI) of the user equipment that has not been received after successful reception of a Random Access Response for the preamble not selected by the user equipment (see, e.g., 3GPP TS 36.321 V11.3.0 (2013-06)). For example, base station 110B may signal whether user equipment 114 is active in small cell 112B by sending a message to base station 110A. The message may be sent directly from base station 110B to base station 110A. In addition or alternatively, the message may be sent indirectly via user equipment provided data sent to the network including macro base station 110A and small cell base station 110B. Feedback of past average throughput (which may be signaled between base stations to facilitate efficient scheduling for a dual connectivity user equipment) may also be used to signal to the macro base station that the user equipment is active in small cell and thus which DRX cycle user equipment 114 is using in small cell 112B. In these examples, the master base station or MeNB should know which DRX cycle the user equipment is applying. Minor delays here are not a substantial concern as the user equipment may at most monitor MeNB PDCCH occasionally. The user equipment's measurement requirements on the carrier frequencies, f1 and f2, of the macro base station and the small base station may depend on the respective DRX cycles. 3GPP TS 36.133, Evolved Universal Terrestrial Radio Access (E-UTRA); Requirements for support of radio resource management (TS 36.133) describes examples of measurement requirements which depend on the DRX cycle used.

Although some of the examples refer to macro base stations, small cell base stations, and carrier aggregation, the subject matter disclosed herein may be applied in other frameworks and other types of wireless access points as well. Further, although some of the examples refer to inter-frequency carrier measurements at base stations, the subject matter disclosed herein may be applied to other measurement scenarios as well.

Alternatively or additionally, the user equipment DRX in the macro base station 110A and small cell base station 110B may operate independently. For example, user equipment DRX (or active time) in the MeNB may be based on user equipment scheduling and activity in the MeNB, and user equipment DRX (or active time) in the SeNB may be based on user equipment scheduling and activity in the SeNB. But whenever the user equipment is active in the small cell 112B, the measurement requirements may be dependent, so that user equipment 114 is also required to measure the carrier frequency of the macro base station more frequently. When this is the case, the more frequent measurements in the macro cell are due to activity in the small cell and do not follow the macro cell DRX cycle.

Alternatively or additionally, user equipment measurement requirements may be as in a non-DRX mode whenever the user equipment is active in either the macro cell/base station or the small cell/base station. This may apply to all measurements, or small cell/base station carrier requirements may follow the small cell/base station activity (if DRX configured). In this example, the user equipment may measure all measurement objects according to non-DRX requirements, or SeNB carrier(s) requirements are according to the SeNB activity or SeNB DRX cycle.

In some example embodiments, robust primary cell (Pcell) mobility may be maintained, and the user equipment may receive and measure the carrier frequency PCell more frequently (or at least measures), whenever the user equipment is actively scheduled on either the Pcell carrier or Scell carrier. In some other example embodiment, the other way may be not be necessary to measure small base station carrier frequency more frequently even though the user equipment is actively scheduled in macro cell/macro base station as it does not affect mobility (PCell) robustness. From mobility performance point of view, it may be a better approach to follow the macro cell signal quality more frequently than the small cell signal quality as in dual connectivity handovers happen between macro cells. Small cells may be added and removed when appropriate In some example embodiments, the network may not configure the user equipment with a macro cell DRX cycle longer than for example about 80 milliseconds, when the user equipment is dual connected (for example, a second connection to the small cell base station 110B configured and activated). In some example embodiments, user equipment measurement requirements may be in accordance with non-DRX or for example according to DRX cycle of about 80 milliseconds in the DRX case, if the user equipment is dual connected. As such, the network may not activate the SeNB unless the user equipment is having active traffic and thus it is less likely to need long DRX in the MeNB. In some cases, the network may not activate the SeNB for the user equipment if the user equipment does not have active traffic. Therefore, there may be not so much need for offloading.

Figure 2:
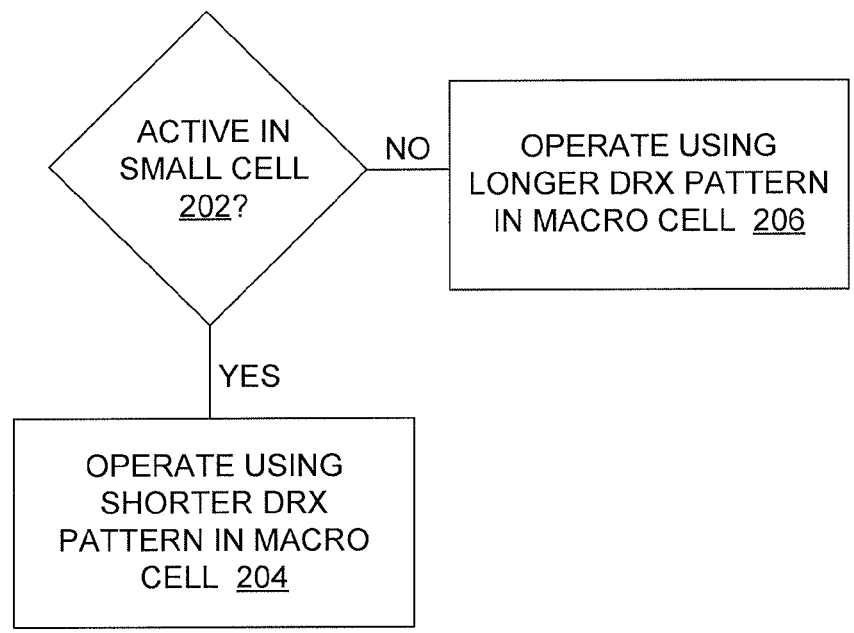
FIG. 2 depicts an example of a process for dual connectivity, in accordance with some exemplary embodiments.

FIG. 2 depicts a process 200 for dual connectivity, in accordance with some example embodiments. The description of FIG. 2 also refers to FIG. 1.

At 202, a determination may be made regarding whether a user equipment is active in a small cell, in accordance with some example embodiments. For example, if user equipment 114 is active with respect to receiving data, transmitting data, making measurements, reading the PDCCH, and the like, the user equipment 114 may be considered active in the small cell 112B. Furthermore, the user equipment 114 may be considered active when the user equipment is in Active Time as defined for example in in DRX section of 3GPP TS 36.321, Evolved Universal Terrestrial Radio Access (E-UTRA); Medium Access Control (MAC) protocol specification, Release 11 (TS 36.321). This active state at the user equipment 114 may be signaled to macro base station 110A.

If the user equipment is active in the small cell (yes at 202), the user equipment may operate, at 204, using a shorter DRX in macro cell 112A, in accordance with some example embodiments. For example, user equipment 114 may operate using a shorter DRX, such as about 40 milliseconds (ms), when the user equipment is active in the small cell 112B, although other time values may be used as well.

If the user equipment ceases to be active (or is not active) in the small cell (no at 202), the user equipment may operate, at 206, using a longer DRX in macro cell 112A, in accordance with some example embodiments. For example, user equipment 114 may operate using a longer DRX, such as about 160 milliseconds (ms), when the user equipment is not active in the small cell 112B, although other time values may be used as well.

Moreover, if the user equipment is not active in the small cell 112B and the macro cell 112A, the user equipment 114 may operate using a longer DRX, such as about for example 160 milliseconds or more, although other times may be used as well.

In some embodiments, instead of configuring two (for example, new) DRX cycles to be used in the MeNB, the existing long DRX cycle and the short DRX cycle (see, for example, TS 36.321) may be reused. Thus, when the user equipment is active in the SeNB, the user equipment may monitor the MeNB cells assuming the short DRX cycle, and when the user equipment is not active in the SeNB, the user equipment may monitor the MeNB cells assuming the long DRX cycle.

The user equipment activity in the SeNB may also defined as follows: when the user equipment is in Active Time in the SeNB (as defined for example in Section 5.7 of TS 36.321) or in addition when drxShortCycleTimer is running.

Changing the DRX cycle for the MeNB when the user equipment is active in the SeNB may also be used. For instance, from a signaling point of view, if the signaling radio bearer is configured to be transmitted only via the MeNB, then signaling is faster when the user equipment is active in the SeNB (or in the MeNB) and can be slower when the user equipment is not active. If the user equipment is not active, there is no data to be communicated between the network and the user equipment and then it is not problematic if signaling has additional latency due to longer DRX cycle. Since measurement requirements may depend on the DRX cycle, measurements are more frequent when shorter DRX cycle is used.

In some example embodiments, user equipment activity in a serving a small cell served by the SeNB may affect the measurement requirements of the user equipment when measuring a serving cell served by MeNB serving a macro cell/Pcell. For example, the measurement period or measurement cycle to be used, when measuring a serving cell served by the MeNB, may depend on the user equipment activity in the serving cell served by the SeNB. If the user equipment is active in the SeNB, (for example, receiving/transmitting data from/to the SeNB and therefore in DRX Active Time in the SeNB cell), then the user equipment may be required to measure the carrier frequency of a serving cell served by the MeNB more frequently, when compared to for example measurement requirements for non-DRX having a measurement period of 200 milliseconds or a measurement cycle of 40 milliseconds. If the user equipment is not active in the SeNB, then the user equipment may be required to measure the carrier frequency of a serving cell served by the MeNB less frequently with measurement requirements for DRX (for example, measurement period of 5 times the DRX cycle or measurement cycle equal to the DRX cycle). Generally, the measurement period typically equals 5 times the measurement cycle (for example, the user equipment may have to take a minimum of 5 measurement samples during a measurement period).

Although FIG. 2 depicts an operation using a longer DRX pattern, the operations may also include using a longer measurement period or cycle as well. Further, although FIG. 2 depicts an operation using a shorter DRX pattern, the operation may include using a shorter measurement period or cycle as well.

Alternatively or additionally, the user equipment may be configured with two different measurement periods (or cycles). When this is the case, the user equipment may use the shorter period (cycle) when the user equipment is active in the SeNB and the longer period (cycle) when the user equipment is not active in the SeNB. Thus, the activity of the user equipment in the SeNB may not change the DRX cycle but instead the measurement period or cycle.

Figure 3:
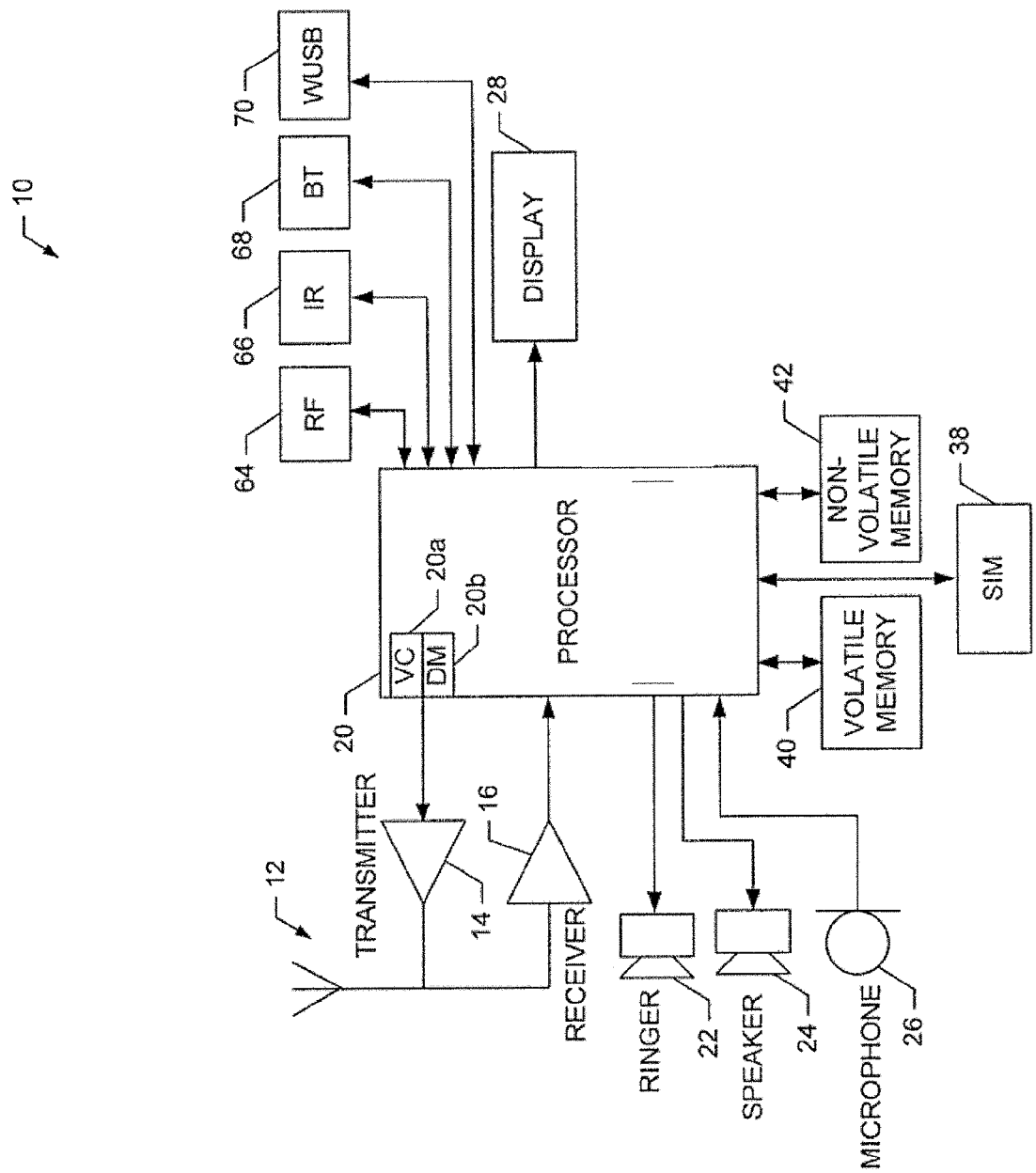
FIG. 3 depicts an example of a user equipment, in accordance with some exemplary embodiments.

FIG. 3 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed. Further, the apparatus may be capable of operating in accordance with dual radio connections, carrier aggregation, and DRX.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment (for example, implementing a first DRX cycle or a second DRX cycle at a macro cell based on activity in a small cell, signaling activity in a cell, and the like). The memories may comprise an identifier, such as for example, an international mobile equipment identification (IMEI) code, capable of uniquely identifying apparatus 10.

Figure 4:
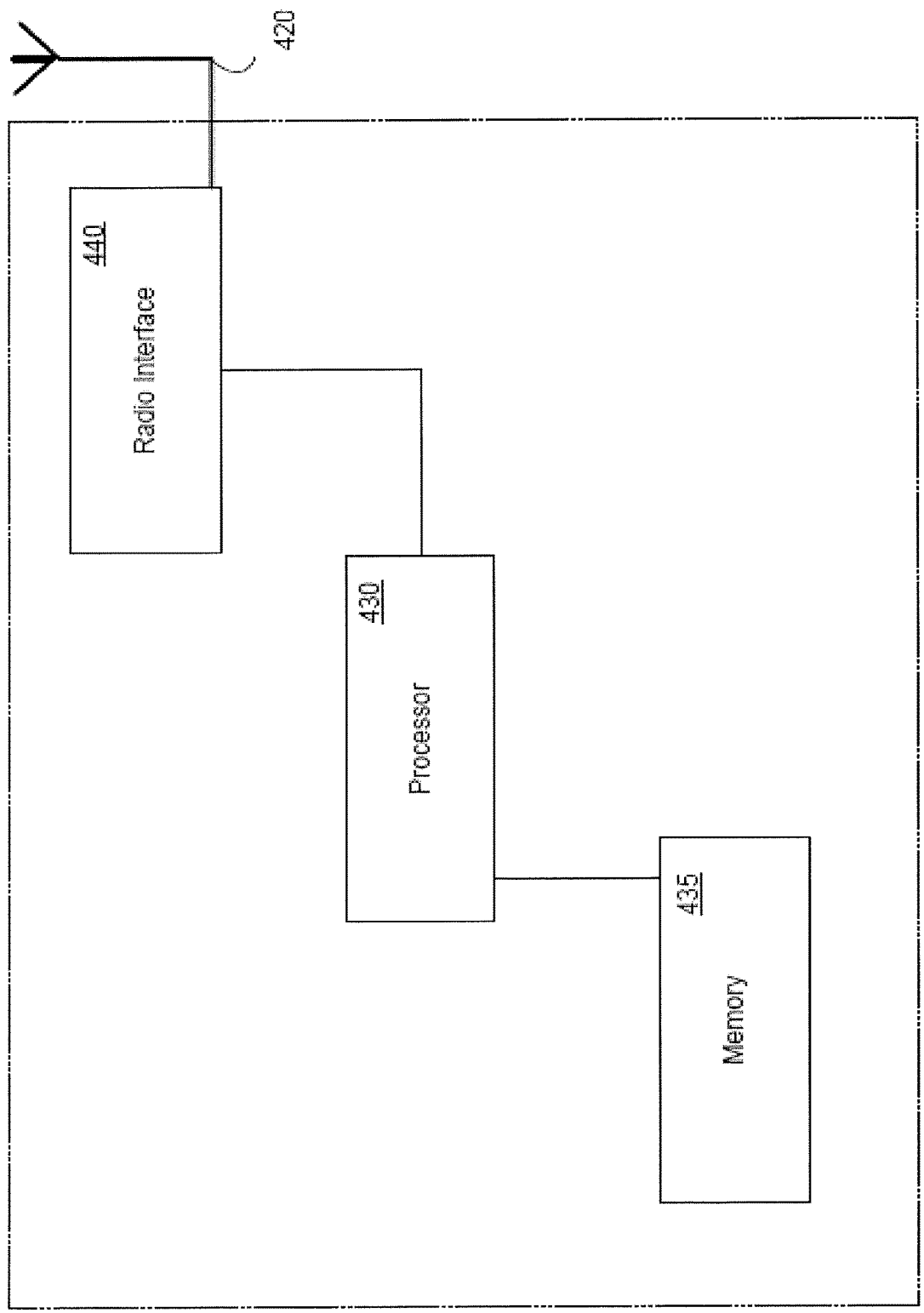
FIG. 4 depicts an example of a base station, in accordance with some exemplary embodiments.

FIG. 4 depicts an example implementation of a network node, such as a base station, access point, and/or any other type of node which may be implemented at base station 110A and/or 110B. The network node may include one or more antennas 420 configured to transmit via a downlink and configured to receive uplinks via the antenna(s) 420. The network node may further include a plurality of radio interfaces 440 coupled to the antenna 420. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 440 may further include other components, such as filters, converters (for example, digital-to-analog converters and/or the like), mappers, a Fast Fourier Transform (FFT) module, and/or the like, to generate symbols for a transmission via one or more downlinks and to receive symbols (for example, via an uplink) The network node may further include one or more processors, such as processor 430, for controlling the network node and for accessing and executing program code stored in memory 435. In some example embodiments, memory 435 includes code, which when executed by at least one processor causes one or more of the operations described herein with respect to a base stations, such as signaling to a macro cell whether a user equipment is active in a small cell and the like).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 3 and 4. A computer-readable medium may comprise a non-transitory computer-readable storage medium that may be any media that can contain or store the instructions for use by or in connection with an instruction execution system, apparatus, or device, such as for example, a computer. Moreover, some of the embodiments disclosed herein include computer programs configured to cause methods as disclosed herein (see, for example, FIGS. 1-4, process 200, and/or the like).

Without in any way limiting the scope, interpretation, or application of the claims appearing below, a technical effect of one or more of the example embodiments disclosed herein may include providing for a dual connectivity user equipment, DRX cycles dependent on user equipment activity in a small cell, such as an Scell (in the case of carrier aggregation) and the like.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
    applying, at a user equipment configured to communicate with a macro wireless access point, at least a first discontinuous receive mode for communication with a macro cell served by the macro wireless access point, in response to the user equipment being active in a secondary cell served by a secondary wireless access point, the first discontinuous receive mode comprising a first discontinuous receive cycle pattern; and
    applying, at the user equipment, a second discontinuous receive mode for communication with the macro cell, in response to the user equipment not being active in the secondary cell, the second discontinuous receive mode comprising a second discontinuous receive cycle pattern, wherein the first discontinuous receive cycle pattern is shorter in duration than the second discontinuous receive cycle pattern.

2. The method of claim 1, wherein the user equipment is configured for dual connectivity with the macro wireless access point and the secondary wireless access point, and wherein the method further comprises:
    applying, at the user equipment, at least a non-discontinuous receive mode for communication with the macro cell, when the user equipment is active in the secondary cell.

3. The method of claim 1, further comprising:
    determining, by the user equipment, whether the user equipment is active in the macro cell, wherein applying the second discontinuous receive mode is in response to determining that the user equipment is not active in the macro cell, and wherein applying the first discontinuous receive mode or a non-discontinuous receive mode is in response to determining that the user equipment is active in the macro cell.

4. The method of claim 1, wherein the macro wireless access point comprises at least one of an evolved node B base station and a macro cell base station, and wherein the secondary wireless access point comprises at least one of a small cell base station and a wireless local area network access point.

5. The method of claim 1, wherein the user equipment makes measurements in the macro cell more frequently in the first discontinuous receive mode than in the second discontinuous receive mode.

6. The method of claim 1, wherein the user equipment comprises:
    a first configuration for communicating with the macro wireless access point;
    a second configuration for communicating with the macro wireless access point, the second configuration different from the first configuration; and
    a third configuration for communicating with the macro wireless access point, the third configuration different from the first configuration and the second configuration,
    wherein applying the first discontinuous receive mode comprises configuring the user equipment according to the first configuration, wherein applying the second discontinuous receive mode comprises configuring the user equipment according to the second configuration, and wherein applying a non-discontinuous receive mode comprises configuring the user equipment according to the third configuration.

7. The method of claim 6, wherein the first discontinuous receive cycle pattern comprises about a 40 millisecond cycle, and the second discontinuous receive cycle pattern comprises about a 160 millisecond cycle.

8. The method of claim 1, wherein the user equipment being active comprises at least one of the user equipment making measurements, receiving data, and transmitting data.

9. An apparatus configured to communicate with a macro wireless access point, the apparatus comprising:
    at least one processor; and
    at least one memory including computer program code, the at least one memory and the computer program code configured to, with the at least one processor, cause the apparatus to at least:
        apply at least a first discontinuous receive mode for communication with a macro cell served by the macro wireless access point, when active in a secondary cell served by a secondary wireless access point, the first discontinuous receive mode comprising a first discontinuous receive cycle pattern; and
        apply a second discontinuous receive mode for communication with the macro cell, when not active in the secondary cell, the second discontinuous receive mode comprising a second discontinuous receive cycle pattern, wherein the first discontinuous receive cycle pattern is shorter in duration than the second discontinuous receive cycle pattern.

10. The apparatus of claim 9, wherein the apparatus comprises and/or is comprised in a user equipment configured for dual connectivity with the macro wireless access point and the secondary wireless access point, wherein the apparatus is further caused to at least:
    apply at least a non-discontinuous receive mode for communication with the macro cell, when active in the secondary cell.

11. The apparatus of claim 9, wherein the apparatus is further caused to at least:
    determine whether the communications with the macro cell are active, wherein applying the second discontinuous receive mode is in response to determining that the communications with the macro cell are not active, and wherein applying the first discontinuous receive mode or a non-discontinuous receive mode is in response to determining that the communications with the macro cell are active.

12. The apparatus of claim 9, wherein the macro wireless access point comprises at least one of an evolved node B base station and a macro cell base station, and wherein the secondary wireless access point comprises at least one of a small cell base station and a wireless local area network access point.

13. The apparatus of claim 9, wherein the apparatus is further caused to at least make measurements in the macro cell more frequently in the first discontinuous receive mode than in the second discontinuous receive mode.

14. The apparatus of claim 9, further comprising:
a first configuration for communicating with the macro wireless access point;
a second configuration for communicating with the macro wireless access point, the second configuration different from the first configuration; and
a third configuration for communicating with the macro wireless access point, the third configuration different from the first configuration and the second configuration,
wherein applying the first discontinuous receive mode comprises communicating according to the first configuration, wherein applying the second discontinuous receive mode comprises communicating according to the second configuration, and wherein applying a non-discontinuous receive mode comprises communicating according to the third configuration.

15. The apparatus of claim 14, wherein the first discontinuous receive cycle pattern comprises about a 40 millisecond cycle, and the second discontinuous receive cycle pattern comprises about a 160 millisecond cycle.

16. The apparatus of claim 9, wherein being active comprises at least one of making measurements, receiving data, and transmitting data.

17. A non-transitory computer readable medium including computer program code, which when executed by at least one processor causes operations comprising:
applying, at a user equipment configured to communicate with a macro wireless access point, at least a first discontinuous receive mode for communication with a macro cell served by the macro wireless access point, when the user equipment is active in a secondary cell served by a secondary wireless access point, the first discontinuous receive mode comprising a first discontinuous receive cycle pattern; and
applying, at the user equipment, a second discontinuous receive mode for communication with the macro cell, when the user equipment is not active in the secondary cell, the second discontinuous receive mode comprising a second discontinuous receive cycle pattern, wherein the first discontinuous receive cycle pattern is shorter in duration than the second discontinuous receive cycle pattern.

18. The computer readable medium of claim 17, wherein the user equipment is configured for dual connectivity with the macro wireless access point and the secondary wireless access point, and wherein the operations further comprise:
applying, at the user equipment, at least a non-discontinuous receive mode for communication with the macro cell, when the user equipment is active in the secondary cell.

19. The computer readable medium of claim 17, wherein the macro wireless access point comprises at least one of an evolved node B base station and a macro cell base station, and wherein the secondary wireless access point comprises at least one of a small cell base station and a wireless local area network access point.

20. The computer readable medium of claim 17, wherein the user equipment comprises:
a first configuration for communicating with the macro wireless access point;
a second configuration for communicating with the macro wireless access point, the second configuration different from the first configuration; and
a third configuration for communicating with the macro wireless access point, the third configuration different from the first configuration and the second configuration,
wherein applying the first discontinuous receive mode comprises configuring the user equipment according to the first configuration, wherein applying the second discontinuous receive mode comprises configuring the user equipment according to the second configuration, and wherein applying a non-discontinuous receive mode comprises configuring the user equipment according to the third configuration.

* * * * *